United States Patent
Koenig

[15] 3,650,546
[45] Mar. 21, 1972

[54] TRAILER HITCH

[72] Inventor: Alvin D. Koenig, Route 1, Box 1645, Smithfield, Tex. 76080

[22] Filed: July 22, 1970

[21] Appl. No.: 57,040

[52] U.S. Cl. ..........................................280/423, 280/512
[51] Int. Cl. .....................................B62d 53/00, B60d 1/06
[58] Field of Search ..............................280/511–513, 423, 280/438

[56] References Cited

UNITED STATES PATENTS

| 2,292,751 | 8/1942 | Forney | 280/512 X |
| 3,257,126 | 6/1966 | Robertson | 280/511 |
| 3,336,050 | 8/1967 | Dale | 280/423 R |
| 3,336,051 | 8/1967 | Dale | 280/423 R |
| 3,390,896 | 7/1968 | Philapy | 280/423 R |

FOREIGN PATENTS OR APPLICATIONS

| 809,600 | 12/1936 | France | 280/512 |

Primary Examiner—Leo Friaglia
Attorney—J. Bruce Synnott, Jr.

[57] ABSTRACT

A trailer hitch connecting a trailer vehicle to a tractor vehicle comprising a pick up truck, the trailer vehicle having a draw bar extending over the tail gate of the truck and turned downwardly at its front end for attachment to the truck.

The invention includes an upstanding ball hitching element mounted on the frame of the truck, below the floor, and companion hitching means on the draw bar, as hereinafter described, extending through a hole in the floor for engagement with the ball.

The downwardly turned front end portion of the draw bar is round in transverse section and has a pair of diametrically opposed dogs pivotally connected to its lower end and depending therefrom for overlying engagement with opposite sides of the ball, to secure the ball between them.

A cylindrical member surrounds the lower end of the draw bar, to which it is connected by threads, and extends downwardly therefrom, around the dogs. The cylindrical member has its interior surface tapered downwardly and radially outwardly adjacent its lower end for overlying engagement with the opposing outer surfaces of the dogs, to squeeze them radially inwardly in clamping engagement with the ball, in the lowermost position of the cylindrical member relative to the draw bar.

The invention further includes handle means on the cylindrical member for turning it on its threads to thereby adjust it longitudinally relative to the draw bar. The handle means consists of a hand wheel loosely encircling the cylindrical member and adjustable circumferentially relative thereto. The hand wheel and the cylindrical member have mutually opposing means for abutting engagement with each other to limit circumferential adjustment of the hand wheel relative to the cylindrical member within fixed predetermined limits.

6 Claims, 7 Drawing Figures

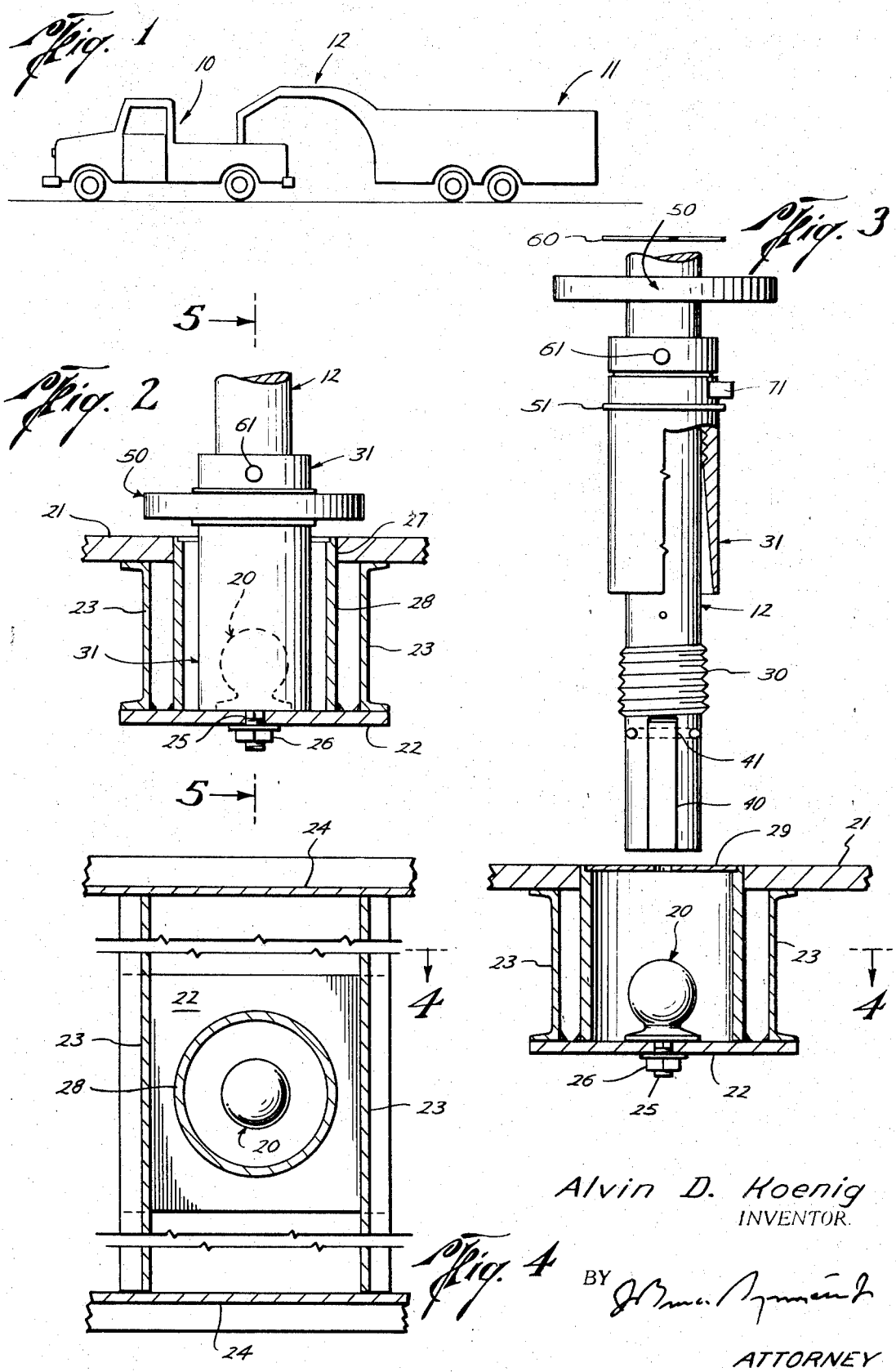

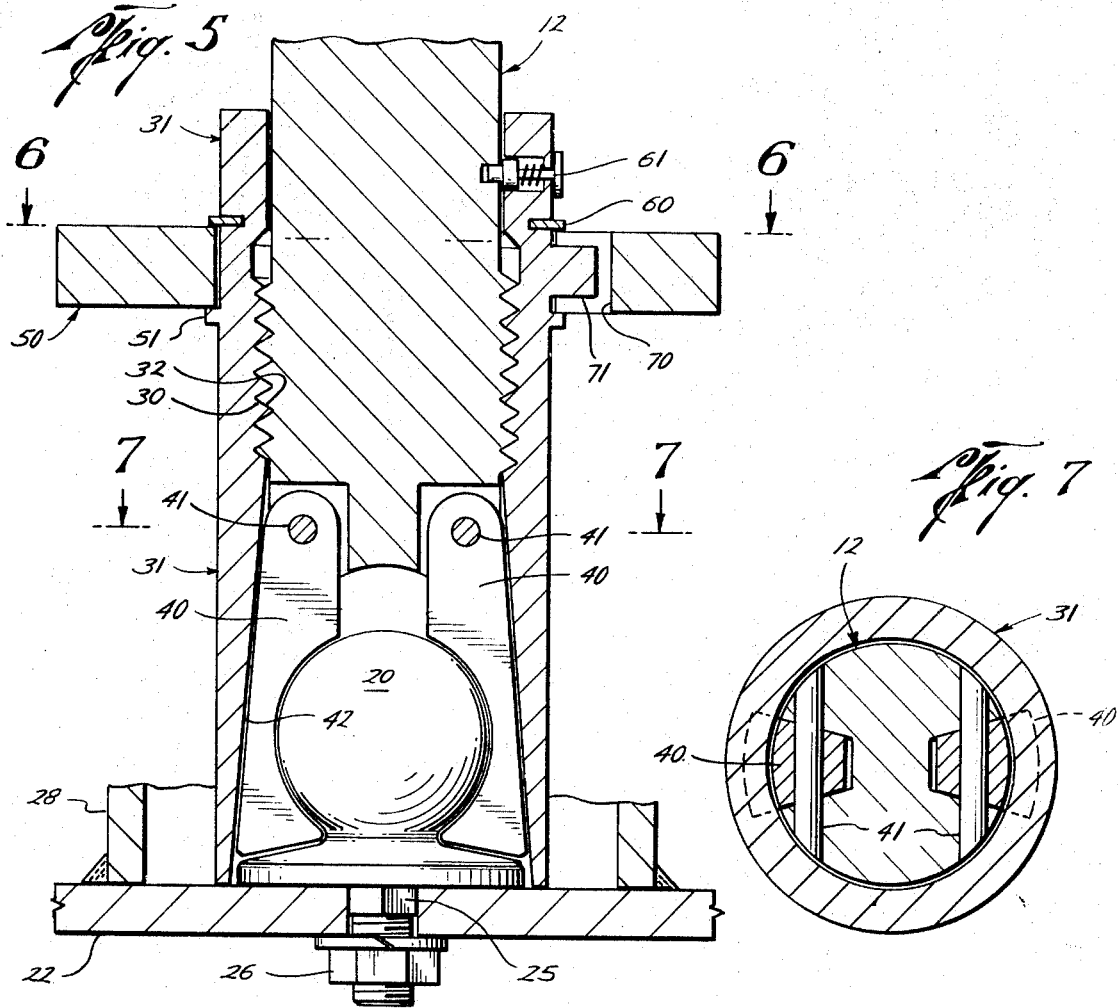
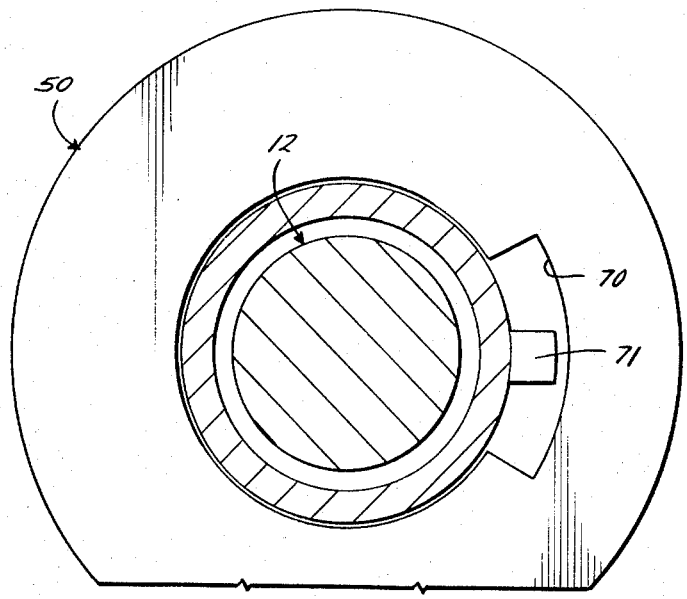

TRAILER HITCH

This invention relates to a trailer hitch, and it concerns more particularly a trailer hitch connecting a "goose neck" type draw bar arranged on a trailer vehicle to a tractor vehicle, specifically a pick up truck.

The invention contemplates an arrangement in which the draw bar of the trailer vehicle extends over the tail gate of the truck and is connected at its front end to the truck by hitching means as hereinafter described.

The trailer hitch of the invention includes an upstanding ball hitching element on the truck, below the floor thereof, which is mounted on a steel plate extending between a pair of cross members which are connected at their ends to a pair of side rails forming portions of the truck frame.

The ball is accessible through a hole in the floor, and is surrounded by an upstanding pipe which registers with the hole, forming a well for the ball below the floor which is closed by a cover plate when not in use.

The downwardly turned front end of the draw bar is formed in part by a length of steel shafting, round in transverse section, which is threaded for a short distance near its lower end for engagement by a cylindrical member as hereinafter described, which surrounds the draw bar and depends therefrom.

A pair of diametrically opposed dogs are pivotally connected to the lower end of the draw bar and depend therefrom for overlying engagement with opposite sides of the ball hitching element. The lower end of the draw bar, which with the dogs extends downwardly within the lower end portion of the cylindrical member, is hollow and forms a downwardly facing cavity or socket which is engageable over the ball. The opposing inner surfaces of the dogs are curved to correspond to the curvature of the ball, and the outer surfaces of the dogs are inclined downwardly and radially outwardly, in one position thereof, for clamping engagement by the correspondingly tapered interior surface of the cylindrical member adjacent its lower end, surrounding the dogs.

A planar metal ring, which is of substantially larger diameter than the cylindrical member and is adapted to be grasped in the hands, in the manner of a hand wheel, loosely encircles the upper end portion of the cylindrical member and extends radially outwardly a substantial distance beyond it.

The planar ring, which is adjustable circumferentially relative to the cylindrical member, is secured between an upwardly facing shoulder or enlargement on the cylindrical member, below the ring, and a snap ring which is received in a groove therefor in the cylindrical member immediately above the ring.

A spring loaded pin, which is received in aligned openings therefor in the cylindrical member and in the draw bar, secures the cylindrical member against rotative displacement relative to the draw bar in one of its circumferentially adjusted positions relative thereto.

The planar ring, which is characterized by its heavy weight, has an arcuate indentation or recess in its inner periphery, and the cylindrical member has an integral lug extending radially outwardly therefrom in opposing relation to the indented portion of the planar ring, in selective abutting engagement with one end of the arcuate indentation, in one of the circumferentially adjusted positions of the ring, whereby the ring is adjustable circumferentially within fixed predetermined limits relative to the cylindrical member.

The cylindrical member is turned on its threads, to tighten it, and to disengage it from the draw bar, whereby it may be raised to release the dogs from the ball, by means of the planar ring, which serves as a wrench, and also has a bumping action, upon selective abutting engagement of opposite ends of the arcuate indentation with the opposing sides of the lug, useful in tightening and loosening the threads.

The invention will be readily understood by referring to the following description and the accompanying drawing, in which:

FIG. 1 is a side elevational view showing diagrammatically a trailer vehicle having a "goose neck" type draw bar in position for towing by a tractor vehicle, specifically a pick up truck, showing the draw bar extending over the tail gate of the truck and having its front end connected to the truck, below the floor thereof, by hitching means embodying the invention as hereinafter described;

FIG. 2 is a fragmentary elevational view on an enlarged scale, partly in section taken on a median line, showing a floor portion of the truck and a downwardly turned front end portion of the draw bar, showing a ball hitching element, illustrated in broken lines, mounted on the truck below the floor, and showing companion hitching means on the front end of the draw bar, seated on the ball hitching element and operatively connected thereto, whereby the trailer vehicle is connected to the truck, for towing, by a swivel type joint;

FIG. 3 is a view similar to FIG. 2 but showing some additional parts, showing the hitching means on the draw bar disengaged from the ball hitching element and raised above the floor of the truck, and showing the parts in disconnected, spaced apart relation to each other;

FIG. 4 is a sectional plan view taken on the line 4—4 of FIG. 3;

FIG. 5 is a sectional elevational view on an enlarged scale taken on the line 5—5 of FIG. 2;

FIG. 6 is a sectional plan view taken on the line 6—6 of FIG. 5; and

FIG. 7 is a sectional plan view taken on the line 7—7 of FIG. 5.

Referring to FIG. 1 of the drawing, the numeral 10 designates generally a pick up truck, and the numeral 11 indicates generally a trailer vehicle having a "goose neck" type draw bar, indicated generally by the numeral 12, arranged thereon whereby the trailer vehicle 11 is connected to the truck 10.

As shown, the trailer vehicle 11 is in position for towing by the truck 10, and the draw bar 12 extends over the tail gate of the truck 10 and has its front end connected to the truck 10, below the floor thereof, by hitching means embodying the invention as hereinafter described.

The trailer hitch of the invention includes an upstanding ball hitching element, designated generally by the numeral 20, which is arranged on the truck 10 below the floor thereof, shown in FIGS. 2 and 3 and indicated by the numeral 21. The ball hitching element 20 is supported on a steel plate 22 which extends between a pair of cross members 23 which are connected at their ends to a pair of side rails 24 forming portions of the truck frame, and is connected to the plate 22 by a square shouldered stud 25 having a nut 26 thereon.

The ball 20 is accessible through a hole 27 in the floor 21, and is surrounded by an upstanding pipe 28 which registers with the hole 27, forming a well for the ball 20 below the floor 21 which is closed by a cover plate 29, shown in FIG. 3, when not in use.

The depending front end of the draw bar 12 is formed in part by a length of steel shafting, round in transverse section, which is threaded for a short distance near its lower end, as at 30. A cylindrical member as hereinafter described, indicated generally by the numeral 31, which surrounds the draw bar 12 and depends therefrom, is internally threaded near its upper end, as at 32, whereby it is removably connected to the draw bar 12 and is adjustable longitudinally relative thereto.

A pair of diametrically opposed dogs, indicated by the numerals 40, are pivotally connected to the lower end of the draw bar 12, as at 41, and depend therefrom for overlying engagement with opposite sides of the ball hitching element 20, to secure the ball 20 between them.

As shown best in FIG. 5, the lower end of the draw bar 12 is hollow and forms a downwardly facing cavity or socket engageable over the ball hitching element 20, and the opposing inner surfaces of the dogs 40 are curved to correspond to the curvature of the ball 20. The outer surfaces of the dogs 40, in the positions shown, are inclined downwardly and radially outwardly for clamping engagement by the correspondingly tapered interior surface of the cylindrical member 31 adjacent its lower end, as at 42.

A planar metal ring, shown in FIGS. 5 and 6 and designated generally by the numeral 50, which is of substantially larger diameter than the cylindrical member 31 and is adapted to be grasped in the hands, in the manner of a hand wheel, loosely encircles the upper end of the cylindrical member 31, and is secured between an upwardly facing shoulder or enlargement 51 on the cylindrical member 31, below the planar ring 50, and a snap ring, indicated by the numeral 60, which is received in a groove therefor in the cylindrical member 31, immediately above the ring 50.

A spring loaded pin 61, which is received in aligned openings therefor in the cylindrical member 31 and the draw bar 12, secures the cylindrical member 31 against rotative displacement relative to the draw bar 12 in one of its circumferentially adjusted positions relative thereto.

The planar ring 50, which is characterized by its heavy weight, is adjustable circumferentially relative to the cylindrical member 31. The ring 50 has an arcuate indentation or recess 70 in its inner periphery, and the cylindrical member 31 has an integral lug 71 extending radially outwardly therefrom, in opposing relation to the indented portion of the ring 50, for selective abutting engagement with opposite ends of the arcuate indentation 70 to thereby limit circumferential adjustment of the ring 50 relative to the cylindrical member 31 within fixed predetermined limits.

The cylindrical member 31 is turned on its threads, to tighten it, and to disengage it from the draw bar 12, whereby it may be raised to release the dogs 40 from the ball 20, by means of the planar ring 50, which serves as a wrench, and also has a bumping action, upon abutting engagement of opposite ends of the arcuate indentation or recess 70 with the opposing sides of the lug 71, useful in tightening and loosening the threads 30, 32.

The invention may be modified in various ways without departing from the spirit and scope thereof.

I claim:

1. In a trailer hitch connecting a trailer vehicle to a tractor vehicle comprising a pick up truck, the trailer vehicle having a draw bar extending over the tail gate of the truck and turned downwardly at its front end for attachment to the truck, the combination of an upstanding ball hitching element mounted on the frame of the truck, below the floor, and companion hitching means on the draw bar extending through a hole in the floor for engagement with the ball, the downwardly turned front end portion of the draw bar being round in transverse section and having a pair of diametrically opposed dogs pivotally connected to its lower end and depending therefrom for overlying engagement with opposite sides of the ball, to secure the ball between them, a cylindrical member surrounding the lower end of the draw bar and extending downwardly therefrom, around the dogs, the cylindrical member being connected to the draw bar by threads and having its interior surface tapered downwardly and radially outwardly adjacent its lower end for overlying engagement with the opposing outer surfaces of the dogs, to squeeze them radially inwardly in clamping engagement with the ball, in the lowermost position of the cylindrical member relative to the draw bar, and handle means on the cylindrical member for turning it on its threads to thereby adjust it longitudinally relative to the draw bar.

2. The structure of claim 1, and retractable means on the cylindrical member engageable with the draw bar to prevent rotative displacement of the cylindrical member relative to the draw bar in one of its circumferentially adjusted positions.

3. The structure of claim 1, the lower end of the draw bar being hollow and forming a downwardly facing cavity or socket engageable over the ball hitching element, and the opposing inner surfaces of the dogs being conformable to the surface of the ball.

4. The structure of claim 1, the handle means consisting of a hand wheel loosely encircling the cylindrical member and adjustable circumferentially relative thereto, and the hand wheel and the cylindrical member having mutually opposing means for abutting engagement with each other to limit circumferential adjustment of the hand wheel relative to the cylindrical member within fixed predetermined limits.

5. The structure of claim 1, the handle means consisting of a planar metal ring, of substantially larger diameter than the cylindrical member, characterized by its heavy weight, loosely encircling the cylindrical member and extending radially outwardly therefrom, the planar ring being adjustable circumferentially relative to the cylindrical member, and having an arcuate indentation or recess in its inner periphery, and the cylindrical member having an integral lug extending radially outwardly therefrom in opposing relation to the indented portion of the ring, for abutting engagement, selectively, with opposite ends of the arcuate indentation to limit circumferential adjustment of the ring relative to the cylindrical member within fixed predetermined limits.

6. The structure of claim 5, the planar ring being operable as a wrench and also having a bumping action, upon abutting engagement of opposite ends of the arcuate indentation with the lug, useful in turning the cylindrical member on its threads.

* * * * *